United States Patent
Prenter et al.

(10) Patent No.: US 11,274,559 B2
(45) Date of Patent: Mar. 15, 2022

(54) TURBINE BLADE TIP DIRT REMOVAL FEATURE

(71) Applicant: United Technologies Corporation, Farmington, CT (US)

(72) Inventors: Robin Prenter, Avon, CT (US); Timothy J. Jennings, New Britain, CT (US); Carey Clum, East Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 72 days.

(21) Appl. No.: 16/743,435

(22) Filed: Jan. 15, 2020

(65) Prior Publication Data

US 2021/0215063 A1    Jul. 15, 2021

(51) Int. Cl.
*F01D 5/18* (2006.01)
*F02C 7/30* (2006.01)

(52) U.S. Cl.
CPC .................. *F01D 5/18* (2013.01); *F02C 7/30* (2013.01); *F05D 2260/607* (2013.01)

(58) Field of Classification Search
CPC ......... F01D 5/18; F02C 7/30; F05D 2260/607
See application file for complete search history.

(56) References Cited

U.S. PATENT DOCUMENTS

| 5,062,768 | A * | 11/1991 | Marriage | ................ F01D 5/186 416/97 R |
| 7,695,243 | B2 | 4/2010 | Lee et al. | |
| 8,511,992 | B2 | 8/2013 | Dahmer et al. | |
| 2009/0081024 | A1 * | 3/2009 | Tibbott | ................... F01D 5/187 415/115 |
| 2009/0155088 | A1 * | 6/2009 | Lee | .......................... F01D 5/20 416/90 R |
| 2011/0305583 | A1 * | 12/2011 | Lee | ........................ F01D 25/12 416/97 R |
| 2014/0030101 | A1 * | 1/2014 | Mishra | ..................... F01D 5/20 416/223 R |
| 2016/0341046 | A1 | 11/2016 | Feldmann et al. | |
| 2019/0145266 | A1 | 5/2019 | Crites et al. | |
| 2019/0186273 | A1 | 6/2019 | Haldmann et al. | |
| 2020/0011199 | A1 | 1/2020 | Verney et al. | |

FOREIGN PATENT DOCUMENTS

| EP | 1793086 | 6/2007 |
| EP | 1882817 | 1/2008 |
| EP | 3473808 | 4/2019 |

OTHER PUBLICATIONS

European Search Report for Application No. 21151655.4 dated Mar. 23, 2021.

* cited by examiner

*Primary Examiner* — Katheryn A Malatek
(74) *Attorney, Agent, or Firm* — Carlson, Gaskey & Olds, P.C.

(57) ABSTRACT

A gaspath component for a gas turbine engine includes a platform. A body extends outward from the platform and includes at least one internal cooling passage. The internal cooling passage includes at least one particulate redirection feature defined at an end of the body opposite the platform. The at least one particulate redirection feature includes a first face oblique to and facing an expected flow of fluid through the internal cooling passage and defines at least one corresponding opening.

13 Claims, 4 Drawing Sheets

TURBINE BLADE TIP DIRT REMOVAL FEATURE

TECHNICAL FIELD

The present disclosure relates generally to Turbine blade cooling systems, and more specifically to a dirt removal feature for the same.

BACKGROUND

Gas turbine engines, such as those utilized in commercial and military aircraft, include a compressor section that compresses air, a combustor section in which the compressed air is mixed with a fuel and ignited, and a turbine section across which the resultant combustion products are expanded. The expansion of the combustion products drives the turbine section to rotate. As the turbine section is connected to the compressor section via a shaft, the rotation of the turbine section further drives the compressor section to rotate. In some examples, a fan is also connected to the shaft and is driven to rotate via rotation of the turbine as well.

Within the turbine section are multiple rotor blades configured in multiple stages. Due to their exposure to extreme temperatures from the combustion products, the turbine blades often include internal cooling systems that utilize a coolant, such as air, to prevent damage to the turbine blade resulting from excessive thermal cycling. Such systems often source the cooling air from compressor bleeds or ambient atmosphere. The air provided from these sources can include dirt or other contaminants, referred to collectively as particulate, entrained within the airflow. When the entrained particulate passes through the internal cooling systems, a portion of the entrained particulate can deposit within the cooling systems decreasing or inhibiting the effectiveness of the internal cooling.

SUMMARY OF THE INVENTION

In one exemplary embodiment a gaspath component for a gas turbine engine includes a platform, a body extending outward from the platform and including at least one internal cooling passage, the internal cooling passage includes at least one particulate redirection feature defined at an end of the body opposite the platform, and the at least one particulate redirection feature including a first face oblique to and facing an expected flow of fluid through the internal cooling passage and defining at least one corresponding opening.

In another example of the above described gaspath component for a gas turbine engine the first face defines an angle of at least 15 degrees relative to the expected flow of fluid.

In another example of any of the above described gaspath components for a gas turbine engine the at least one particulate redirection feature is integral to the body.

In another example of any of the above described gaspath components for a gas turbine engine the at least one particulate redirection feature includes a second face oblique to and facing the expected flow of fluid through the internal cooling passage.

In another example of any of the above described gaspath components for a gas turbine engine the first face extends from a sidewall of the internal cooling passage.

In another example of any of the above described gaspath components for a gas turbine engine the first face is a planar surface.

In another example of any of the above described gaspath components for a gas turbine engine the angle of the first face relative to the expected fluid flow varies across the first face.

In another example of any of the above described gaspath components for a gas turbine engine the at least one corresponding opening includes an opening to a squealer tip pocket of the body.

In another example of any of the above described gaspath components for a gas turbine engine the at least one corresponding opening includes an opening to a tip shelf of the body.

In another example of any of the above described gaspath components for a gas turbine engine the at least one particulate redirection feature includes a second face oblique to and facing the expected fluid flow direction.

In another example of any of the above described gaspath components for a gas turbine engine the second face is configured to redirect particulate to a second opening of the at least one openings.

In another example of any of the above described gaspath components for a gas turbine engine the at least one particulate redirection feature has a chevron cross section.

In another example of any of the above described gaspath components for a gas turbine engine the particulate redirection feature is disposed at a radially outermost tip of the body.

In another example of any of the above described gaspath components for a gas turbine engine the particulate redirection feature is inset from a radially outermost tip of the body.

An exemplary method for purging particulate from a gaspath body includes redirecting particulate entrained in a cooling gas flow to a purge opening by reflecting the particulate off a particulate redirection feature, the particulate redirection feature including a first face oblique to and facing an expected flow of the cooling gas flow through an internal cooling passage and defining the purge opening, and expelling particulate through the purge opening into a primary gaspath of a gas turbine engine.

In another example of the above described exemplary method for purging particulate from a gaspath body reflecting the particulate off the particulate redirection feature includes reflecting the particulate off a single face of the particulate redirection feature.

In another example of any of the above described exemplary methods for purging particulate from a gaspath body the single face of the particulate redirection feature has an angle of at least 15 degrees relative to a direction of flow of the cooling gas flow.

In one exemplary embodiment a gas turbine engine includes a compressor section, a combustor section fluidly connected to the compressor section, a turbine section fluidly connected to the compressor section and including a plurality of turbine stages, and a rotor body disposed in one of the turbine stages, the rotor body including at least one internal cooling passage, the internal cooling passage includes at least one particulate redirection feature defined at an end of the body opposite the platform and the at least one particulate redirection feature including a first face oblique to and facing a flowpath through the internal cooling passage and defining at least one corresponding opening.

In another example of the above described gas turbine engine the rotor body is a turbine blade of a high pressure turbine in the turbine section.

In another example of any of the above described gas turbine engines the rotor body is a first stage turbine blade of the high pressure turbine in the turbine section.

These and other features of the present invention can be best understood from the following specification and drawings, the following of which is a brief description.

BRIEF DESCRIPTION OF THE DRAWINGS

FIG. 4b schematically illustrates a modified construction of the exemplary cast feature of FIG. 4a.

FIG. 4c schematically illustrates another modified construction of the exemplary cast feature of FIG. 4a.

DETAILED DESCRIPTION

Figure 1:
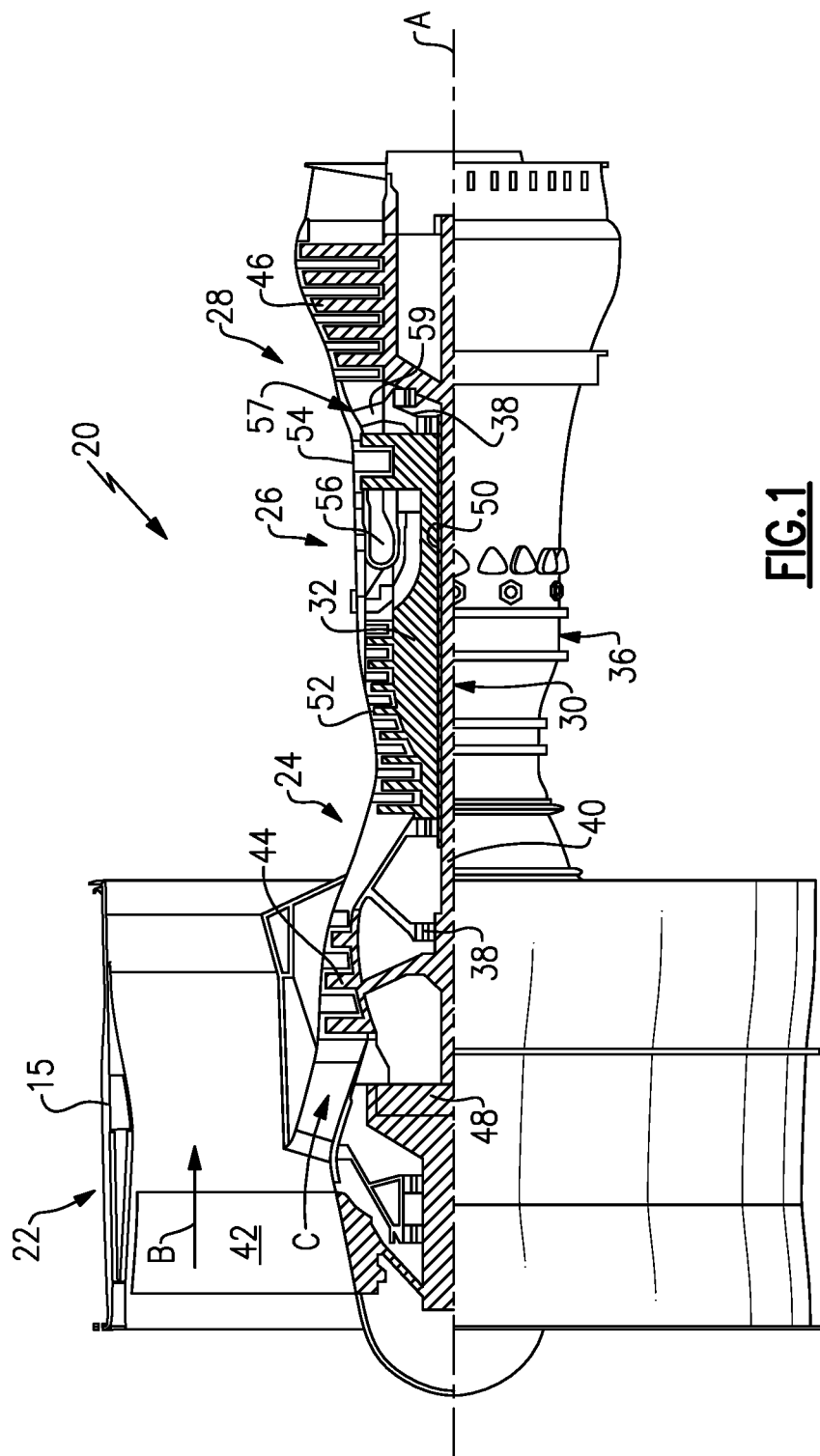
FIG. 1 illustrates a high level schematic view of an exemplary gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine engine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
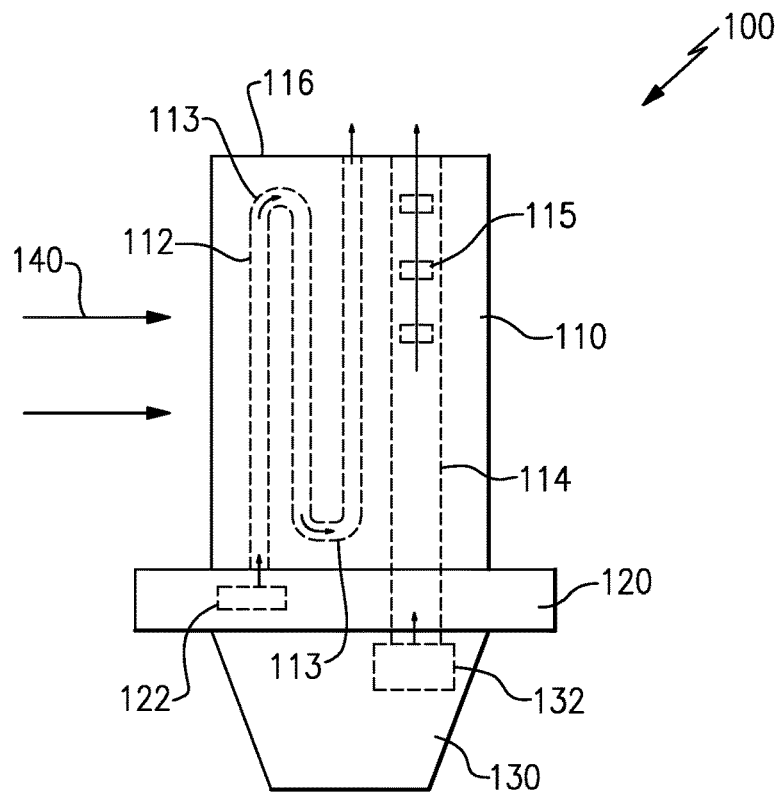
FIG. 2 schematically illustrates an exemplary turbine blade structure for the gas turbine engine of FIG. 1.

With continued reference to FIG. 1, FIG. 2 schematically illustrates a portion of an exemplary turbine rotor 100. The exemplary turbine rotor 100 could be utilized at any stage within the turbine section 28. In one particular example, the turbine rotor 100 is any high pressure turbine rotor. In another example, the turbine rotor 100 is a first stage high pressure turbine rotor. The rotor 100 includes a blade 110 protruding radially outward from a platform 120. A root 130 extends radially inward from the platform 120 and connects the rotor 100 to a shaft of the gas turbine engine 20.

Interior to the rotor 100 are multiple cooling passages 112, 114. Each of the cooling passages 112, 114 is provided cooling air from a radially inward opening 122, 132 in one of the platform 120 and the root 130. Each of the openings 122, 132 operates as a cooling air inlet for the corresponding internal cooling passage 112, 114. Alternative inlet openings and configurations could be used to similar effect. Positioned at a radially outward tip 116 are multiple openings 118, 119 for expelling spent cooling air from the interior cooling passages 112, 114 into a gaspath 140. The radially inward openings 122, 132 can be connected to any cooling air source including compressor bleeds, ambient air, aircraft environmental systems, or any similar source.

Included within the first internal cooling passage 112 are multiple corners 113 forming a serpentine flowpath. Included within the second internal cooling passage 114 are multiple protrusions 115 which operate to turbulate the air passing through the internal cooling passage 114. In a practical example, the illustrated features (serpentine corners 113 and protrusions 115) can be included together in a single internal cooling passage, or utilized separately, depending on the needs of a given cooling passage.

Figure 3:
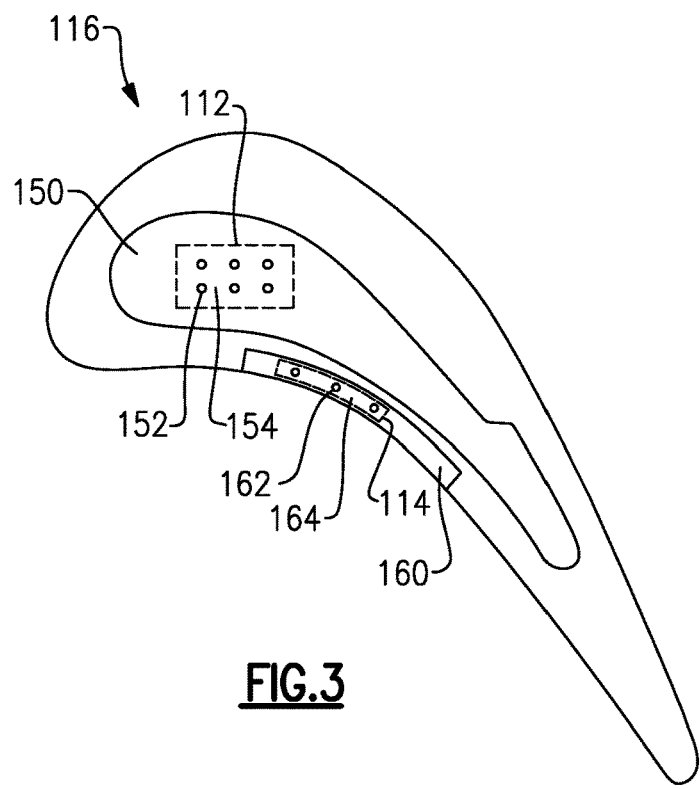
FIG. 3 schematically illustrates a tip portion of the turbine blade structure of FIG. 2 from a radially outward viewing position.

With continued reference to FIGS. 1 and 2, FIG. 3 schematically illustrates the tip 116 of the blade 110 of FIG. 2 according to a non-limiting example. The tip 116 includes a squealer pocket 150 and a tip shelf 160, defined as radial intrusions into the tip 116, with the squealer pocket 150 being fully enclosed by the tip 116 and the tip shelf 160 extending along an edge of the tip 116. The second internal passage 114 extends to the tip shelf 160, and includes openings 162 interspaced with particulate ejection features 164. Similarly, the first internal cooling passage 112 extends to the squealer pocket 150, and includes openings 152 interspaced with particulate ejection features 154. The particulate ejection features are explained in further detail below. In alternative examples, a single internal cooling passage can include openings connected to the squealer pocket 150 and openings connected to the tip shelf 160.

High pressure turbine rotors, such as the rotor 100, exhibit large amounts of internal particulate deposition at the tip 116 of the blade 110. The deposition of particulate at the tip 116 is detrimental to part durability because the particulate can have a low thermal conductivity and can insulate the material of the blade 110 from the cooling air passing through the internal cooling passage 112, 114. In addition the internal deposits can have additional effects such as increasing a pressure drop and constricting the flow area through the blade 110.

In order to mitigate the buildup of particulate at the tip 116 of the blade 110, each of the internal cooling passages includes a cast angled surface (e FIGS. 4a-8) disposed oblique to the expected direction of airflow through the internal cooling passage 112, 114. The angled surface directs particulate to an opening in one of a squealer pocket 150 or tip shelf 160 of the blade 100.

Particulate impacting the cast angled surface with a shallow impact angle, relative to a direction of flow is less likely to deposit than particulate with a more normal impact angle relative to the direction of flow. In other words, by making the cast surface oblique to the direction of flow, the particulate is less likely to deposit. In some examples, this feature is particularly enhanced by utilizing an angle of at least 15 degrees, with larger angles having a greater effect on reducing the deposition of the particulate. In some examples, the particulate ejection features 154, 164 can include dimples, trip strips, or other turbulation features to further enhance the heat transfer at the dirt ejection feature 154, 164.

As the cooling air flows through the internal cooling passages during operation, the entrained particulate strikes the angled particulate ejection features 154, 164 and is ejected through the openings 152, 162 into the corresponding one of the squealer pocket 150 and the tip shelf 160. Once there, the particulate joins the combustion products and is ejected from the gas turbine engine along the primary flowpath.

Figure 4A:
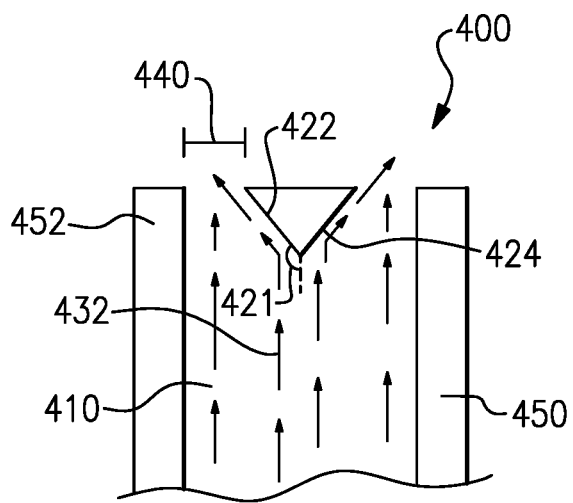
FIG. 4a schematically illustrates an exemplary cast particulate ejection feature.

With continued reference to FIGS. 1-3, FIG. 4a illustrates a first example tip 400 where an internal cooling passage 410 includes a particulate ejection feature 420. The particulate ejection feature 420 is disposed at an outermost end of the passage and defines two deflection surfaces 422, 424, each of which deflects particulate entrained in the flow 430 of cooling air. Openings 440, corresponding to the openings 152 in the example of FIG. 3 are defined between walls 450 of the passage and the particulate ejection feature 420. While the openings are illustrated in FIG. 3 as being circular, it is appreciated that the openings can be any desired shape, and are not limited to the illustrated circular shape. Each of the openings 440 of FIG. 4a is positioned near one of the angled surfaces 422, 424 of the particulate ejection feature 420 and is angled relative to the expected fluid flow by an angle 421 that causes the particulate to be redirected toward the corresponding opening 440.

Figure 4B:
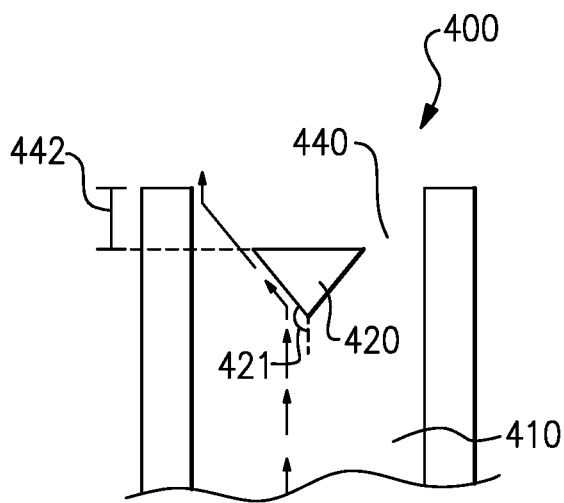

In some examples, it can be desirable to position the particulate ejection feature 420 inset into the internal cooling passage 410. FIG. 4b illustrates one such example. In the illustration of FIG. 4b, the particulate ejection feature 420 is inset into the internal cooling passage 410 via a predetermined inset distance 442. Positioning the particulate expulsion feature 420 inset into the passage 410 can, in some examples, improve the particulate expulsion capabilities by causing the gas flow through the passage to include a first oblique redirection at one of the surfaces 422, 424, and a second oblique redirection at the exterior wall 450 of the passage adjacent to the redirection surface 422, 424.

Figure 4C:
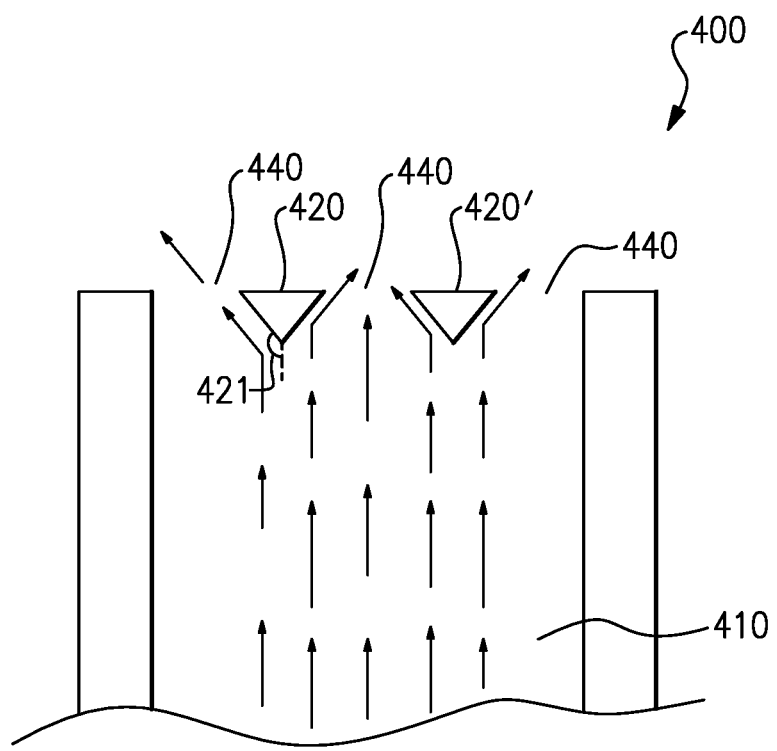

In yet other examples, such as the example illustrated at FIG. 4c, it can be desirable to incorporate multiple redirection features 420, 420' within a single internal passage 410. In order to include multiple particulate ejection features 420, 420' within a single passage, each feature 420, 420' is reduced in size. The configuration of FIG. 4c results in an increase in the total area of the openings 440, as well as an increase in the number of openings 440.

With reference to all of FIGS. 4a, 4b and 4c, it is appreciated that the variations illustrated can be used in conjunction with each other within a single passage, and the particulate ejection features 420 are not mutually exclusive.

Figure 5:
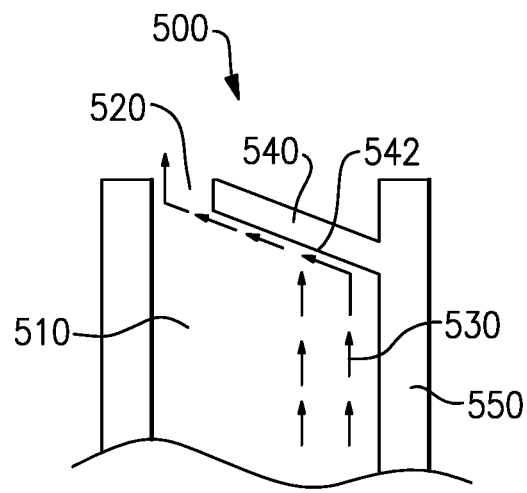
FIG. 5 schematically illustrates an alternate construction of the exemplary cast feature.
Figure 6:
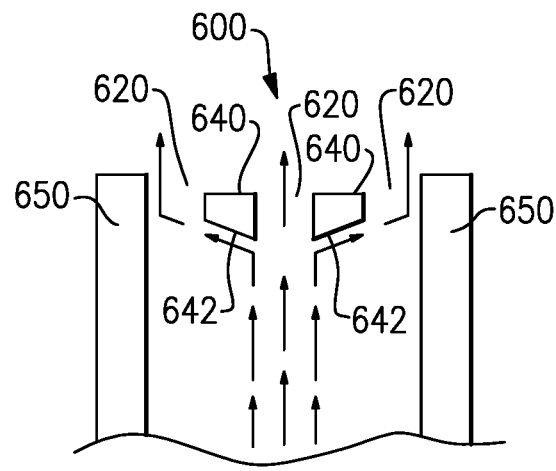
FIG. 6 schematically illustrates another alternate construction of the exemplary cast feature.
Figure 7:
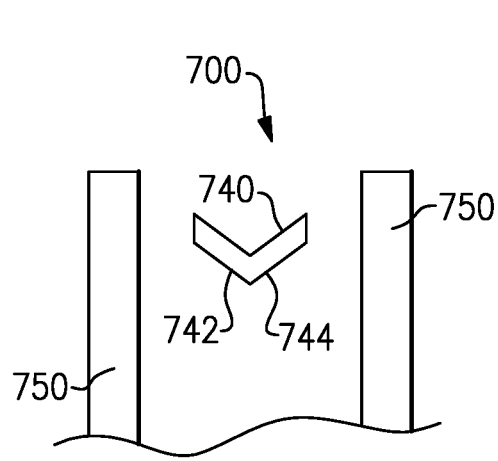
FIG. 7 schematically illustrates another alternate construction where the cast feature is chevron shaped.

With reference again to FIGS. 1-4c, FIG. 5 schematically illustrates an alternate construction of the particulate ejection feature 540 within an internal cooling passage 510 of a tip 500. The exemplary particulate ejection feature 540 extends into the cooling passage 510 from one of the walls 550 and includes a deflection surface 542. The deflection surface 542 is oblique to the flow 530 through the passage 510. In contrast to the example of FIGS. 4a, 4b and 4c, the example of FIG. 5 defines a single opening 520 corresponding to each particulate ejection feature 500. In the example of FIG. 5, the deflection surface 542 is a planar surface that maintains a single constant angle relative to the expected flow direction. In alternative examples, the angle of the deflection surface can vary, thereby allowing the surface angle to account for expected variations in the pressure and/or velocity of the cooling flow through the internal passage.

With continued reference to FIGS. 1-5, FIG. 6 illustrates a modification to the example of FIG. 4c. In the tip 600 of FIG. 6, multiple cast features define three sequential openings 620, with each of the particulate ejection features 640 including a single planar face 642 oblique to the expected direction of fluid flow. Each of the planar faces 642 redirects the particulate to a corresponding outside wall 650. In alternative examples, the faces 642 can be curved, or can include varied angles, and the face 642 is not required to be planar in every example. By insetting the particulate ejection features 640, relative to outermost edge of the tip 600, the redirected particulate contacts the corresponding wall 650, which in turn redirects entrained particulate out of the cooling passage and into the primary flowpath of the gas turbine engine.

Again with reference to FIGS. 1-6, FIG. 7 illustrates a modification to the configurations of FIGS. 4a and 4b, with the tip 700 including a chevron shaped particulate ejection feature 740. The chevron shaped particulate ejection feature 740 includes two redirection surfaces 742, 744, and the chevron can be either inset (as illustrated) into the tip, or positioned at the tip as in the example particulate ejection feature of FIG. 4a. Each redirection surface is angled relative to the expected direction of flow such that particulate is deflected towards a corresponding one of the passage walls 750.

Figure 8:
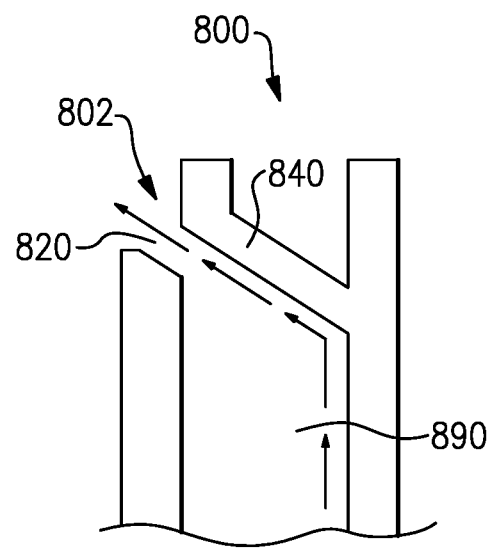
FIG. 8 schematically illustrates the cast feature of FIG. 5 adapted for connection to a tip shelf.

With reference to all of FIGS. 4a-7, the examples are illustrated purging into the squealer pocket. FIG. 8 illustrates a modification to the example of FIG. 5, with the internal cooling passage 810 purging through a tip shelf 802. To accommodate the tip shelf construction, the opening 820 is angled relative to the tip. While the modification is illustrated with regards to the example of FIG. 5, it is appreciated that any of the illustrated examples can be modified to include some, or all, of the openings breaking through to the tip shelf, rather than the corresponding squealer tip pocket. Further, in some examples, a single internal passage can include particulate ejection features 840 redirecting particulate to the tip shelf and redirection features redirecting particulate to the squealer tip pocket within a single embodiment.

With reference to all of FIGS. 4a-8, it is appreciated that the features can be utilized alone or in any combination of features within a single flowpath and the exemplary features are not mutually exclusive. In addition the features can be included disposed at the outermost outlet of the internal cooling passage, or inset, or a combination therefore, depending on the particular cooling needs of the system.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gaspath component for a gas turbine engine comprising:
a platform;
a body extending outward from the platform and including at least one internal cooling passage, the at least one internal cooling passage includes at least one particulate redirection feature defined at an end of the body opposite the platform;
the at least one particulate redirection feature having a chevron cross section including a first face oblique to and facing an expected flow of fluid through the at least one internal cooling passage and a second face oblique to and facing the expected flow of fluid through the at least one internal cooling passage, the first and second faces joining at a point and defining at least one corresponding opening;
wherein the point is the upstream most position of the particulate redirection feature relative to the expected flow of fluid through the at least one internal cooling passage; and
wherein the at least one corresponding opening includes an opening to a squealer tip pocket of the body or an opening to a tip shelf of the body.

2. The gaspath component of claim 1, wherein the first face defines an angle of at least 15 degrees relative to the expected flow of fluid.

3. The gaspath component of claim 1, wherein the at least one particulate redirection feature is integral to the body.

4. The gaspath component of claim 1, wherein the first face is a planar surface.

5. The gaspath component of claim 1, wherein the at least one corresponding opening includes the opening to the squealer tip pocket of the body.

6. The gaspath component of claim 1, wherein the at least one corresponding opening includes the opening to the tip shelf of the body.

7. The gaspath component of claim 1, wherein the second face is configured to redirect particulate to a second opening of the at least one corresponding opening.

8. The gaspath component of claim 1, wherein the particulate redirection feature is disposed at a radially outermost tip of the body.

9. The gaspath component of claim 1, wherein the particulate redirection feature is inset from a radially outermost tip of the body.

10. The gas turbine engine of claim 1, wherein the body is a rotor blade.

11. A gas turbine engine comprising:
a compressor section;
a combustor section fluidly connected to the compressor section;
a turbine section fluidly connected to the compressor section and including a plurality of turbine stages; and
a rotor body disposed in one of said turbine stages, the rotor body including at least one internal cooling passage, the at least one internal cooling passage includes at least one particulate redirection feature defined at an end of the body opposite a platform and the at least one particulate redirection feature having a chevron cross section including a first face oblique to and facing an expected fluid flow direction through the at least one internal cooling passage and a second face oblique to and facing the expected fluid flow direction, the first and second faces joining at a point and defining at least one corresponding opening;
wherein the point is the upstream most position of the particulate redirection feature relative to the expected flow of fluid through the at least one internal cooling passage; and
%wherein the at least one corresponding opening includes an opening to a squealer tip pocket of the body or an opening to a tip shelf of the body.

12. The gas turbine engine of claim 11, wherein the rotor body is a turbine blade of a high pressure turbine in said turbine section.

13. The gas turbine engine of claim 12, wherein the rotor body is a first stage turbine blade of the high pressure turbine in said turbine section.

* * * * *